United States Patent [19]
Williams

[11] Patent Number: 4,912,752
[45] Date of Patent: Mar. 27, 1990

[54] OPTICAL PROJECTOR FOR TRANSPARENCIES AND OPAQUES

[75] Inventor: Richard E. Williams, Lake Mary, Fla.

[73] Assignee: Numa Corporation, Longwood, Fla.

[21] Appl. No.: 170,817

[22] Filed: Mar. 21, 1988

[51] Int. Cl.$^4$ .............................................. G03B 21/28
[52] U.S. Cl. ...................................... 353/63; 353/97; 353/119
[58] Field of Search ...................... 353/63, 64, 65, 66, 353/67, 97, 119, DIG. 4, DIG. 3

[56] References Cited

U.S. PATENT DOCUMENTS

| | | | |
|---|---|---|---|
| 2,596,393 | 5/1952 | Fitzgerald | 353/66 X |
| 3,340,765 | 9/1967 | Herriott | 353/DIG. 4 X |
| 3,512,883 | 5/1970 | Noble | 353/66 X |
| 3,525,566 | 8/1970 | Altman | 353/38 X |
| 3,744,892 | 7/1973 | Shipsey | 353/63 |
| 4,156,561 | 5/1979 | Lucas | 353/DIG. 4 X |
| 4,264,168 | 8/1981 | Baliozian | 353/65 X |

FOREIGN PATENT DOCUMENTS

| | | | |
|---|---|---|---|
| 382192 | 9/1923 | Fed. Rep. of Germany | 353/DIG. 4 |
| 3627740 | 2/1988 | Fed. Rep. of Germany | 353/63 |
| 0096931 | 7/1980 | Japan | 353/63 |
| 505 | of 1912 | United Kingdom | 353/66 |

*Primary Examiner*—Harry N. Haroian
*Attorney, Agent, or Firm*—William M. Hobby, III

[57] ABSTRACT

An optical projector having opaque and transparency operating modes employs a pair of illumination paths, conventional overhead-projection optics, common focus elements, and a large-aperture stage. Oversized objects such as large books or magazines are accommodated by a resilient bottom of a light-constraining hood assembly. A light source is oriented in a manner that eliminates optical or physical interferences between the pair of projection modes. The hood assembly provides novel reflectivity for image intensification in the opaque mode and easy access to the stage for either opaque or transparency projection. Most elements associated with either projection mode can be detached in a unit, leaving solely the remaining mode capability.

4 Claims, 4 Drawing Sheets

OPTICAL PROJECTOR FOR TRANSPARENCIES AND OPAQUES

FIELD OF THE INVENTION

This invention relates generally to overhead projection devices and more specifically to a projector having transparency and opaque projection modes. Still more specifically, this invention relates to a projector structure that uses differing illumination processes but common focusing optics for both opaques and transparencies, and deploys essential elements in a manner that avoids optical or physical interferences between modes. Image intensity in the opaque mode is made commensurate to that of the transparency mode by a novel zonally-divided reflecting interior surface of a light-constraining hood/hatch assembly. In one embodiment the hood/hatch assembly of the invention accommodates oversized objects such as books and liquid-crystal display devices by possessing resiliency over the object stage.

In another embodiment an operator of the invention can easily sequentially interleave opaques and transparencies during presentations by merely switching between a pair of light sources. The switching can occur automatically when the hatch is opened or closed. In yet another embodiment reflective illumination paths enable the use of a common light source for both modes of operation. Most elements of the invention specifically relating to one of the projection modes can be detached as an unit, leaving exclusively the remaining mode capability. The hood and light source structure of the invention efficiently produce high light output without excessive light leakage, specular glare, or operator discomfort. Through use of overhead optics having a relatively large depth of focus, the invention provides sharp focus and uniform brightness over a broad stage aperture.

DESCRIPTION OF THE PRIOR ART

Overhead projectors are widely used in industry, education, and government. Many hundreds of thousands are deployed. They are characterized by an overhead projection lens assembly suspended above a large stage by a staff exhibiting a low profile. Their popularity stems from ease of operation since the large stage aperture enables the use of transparencies that are easily handled, modified, and examined without optical assistance. Oversized transparent objects such as liquid-crystal display devices are readily accommodated. In addition, a high optical efficiency due to the use of a fresnel lens at the stage surface yields a bright projected image with minimal heat generation. Since the optics are all beam-formed, no housing is required to constrain light above the stage, yielding very easy access to the stage. Last, the efficiency enables the use of high f-number optics which provide sharp and easy focus.

Disadvantages of overhead projectors relate to the need for generating transparencies. Although black-and-white transparencies can be produced by most office copiers, multi-colored versions require special equipment, and in any event if the basic document is in the usual opaque form, time consuming and often expensive processing is required.

Opaque projectors, on the other hand, have the advantage of being able to directly project opaque documents and even small objects without preprocessing. The projectors are, however, typically more expensive and, due to the relatively low optical efficiency stemming from diffuse light scattering from opaque documents or objects, they project dimmer images than overhead projectors having comparable light sources. Additionally, opaque projectors must be light-shielded because of the intensity of the diffuse scatter. The enclosure tends to restrict access to the stage and limits its size. The projectors cannot exploit the high gains produced by the fresnels of overhead projectors because of the aforementioned diffuse light scatter. In order to offset the loss in efficiency, opaque projectors usually employ lower f-number projector lenses, but the resulting smaller depth of focus also tends to restrict stage size and make focusing more critical. The light scattering problem prevents the projectors from accommodating oversize objects, in contrast to overhead projectors.

In short, overhead and opaque projectors structurally have little in common but have many attractive complementary capabilities. Structural conflicts and the difficulty of matching performance, particularly with respect to image brightness, have dissuaded development or marketing of combination machines.

OBJECTS OF THE INVENTION

Accordingly, it is an object of this invention to provide a novel optical projector having transparency and opaque operating modes.

Another object of this invention is to provide a novel optical projector for transparencies and opaques having common focusing and staging.

Another object is a method of providing convenient access to a large stage aperture in a transparency and opaque projector.

Still another object is to provide a method of controlling light leakage in an opaque projector while accommodating oversize objects on a large stage aperture.

Yet another object is a method of providing uniform and intense stage illumination for opaques and transparencies while avoiding deleterious specular reflections.

Still another object is providing proper stage illumination for opaques and transparencies in a single projector without optical or physical interferences among required elements.

Yet another object is providing intense stage illumination in an overhead projector for opaques and transparencies without excessive heat at or near the stage.

Still another object is to provide a rapid add convenient operator-controlled method of projecting interleaved sequences of opaques and transparencies.

Yet another object is to provide zonally-divided reflectivity to increase illumination intensity at an opaque object and thereby increase optical efficiency.

Still another object is to provide an optical projector that can be easily modularized for operation in exclusively either a transparency or opaque mode.

These and other objects of the invention will become apparent from the following description when taken in conjunction with the accompanying drawings wherein.

DETAILED DESCRIPTION OF THE INVENTION

Three major problems must be solved when an opaque mode is to be combined with a transparency mode in an overhead projector. The first is that of accommodating both modes without requiring an operator to remove mechanical devices, change focusing, or undertake any inconvenient actions. The mode shift should be as facile as possible.

The second problem is to retain the remarkably easy stage access of an overhead transparency projector while providing the light shielding and avoidance of glare that opaque projection demands. Overhead projectors are so widely accepted that significant changes would prove unacceptable in the field.

The third, and perhaps most serious, problem is that of overcoming the low optical efficiency of opaque projection as compared to that of transparencies. The image brightnesses must be commensurate to obtain market acceptability when both occur in the same machine.

Broadly speaking, the present invention retains basic elements and structure of conventional transparency overhead projectors but adds a novel hood/hatch assembly in a manner that minimally affects transparency projection while adding an opaque capability. The deployment of the added elements not only avoids interference with the transparency mode but simultaneously solves the listed problems.

TRANSPARENCY FEATURES

Figure 2:
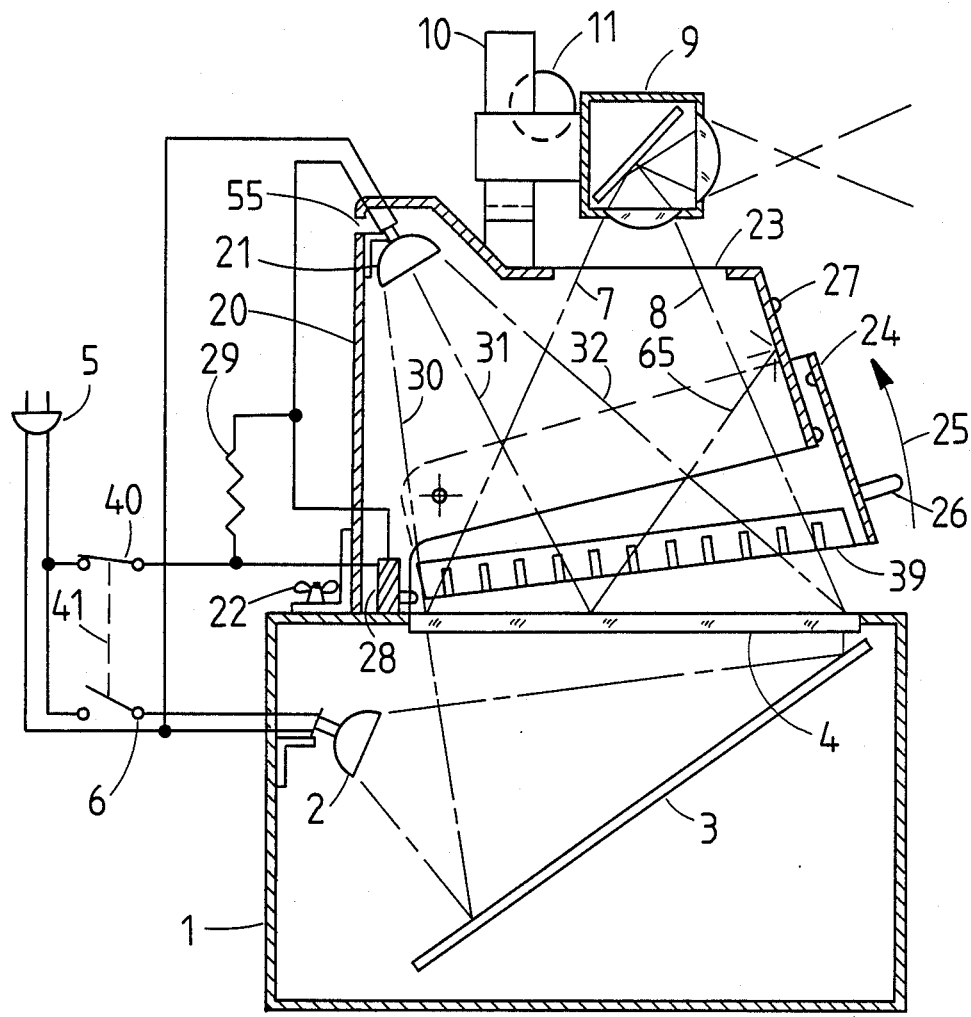
FIG. 2 is a side cross-sectional view of a transparency and opaque projector in accordance with this invention.

Turning now more specifically to the drawings, FIG. 2 is a side cross-sectional view of the dual mode projector. A base housing 1 contains elements necessary for transparency projection including light source 2, mirror 3, and fresnel stage-surface 4. When the light source 2 is connected to a prime energy source via plug 5 and switch 6, the bottom of the stage surface 4 is flooded with relatively uniform light. The light source may take a number of forms such as a halide arc, incandescent lamp, etc. A particularly widely used source is a halogen-cycle lamp with attached dichroic faceted reflector. It provides a very compact intense light source with a circular beam cross-section displaying uniform intensity and low heat transmission due to the dichroic wavelength selectivity.

Figure 6:
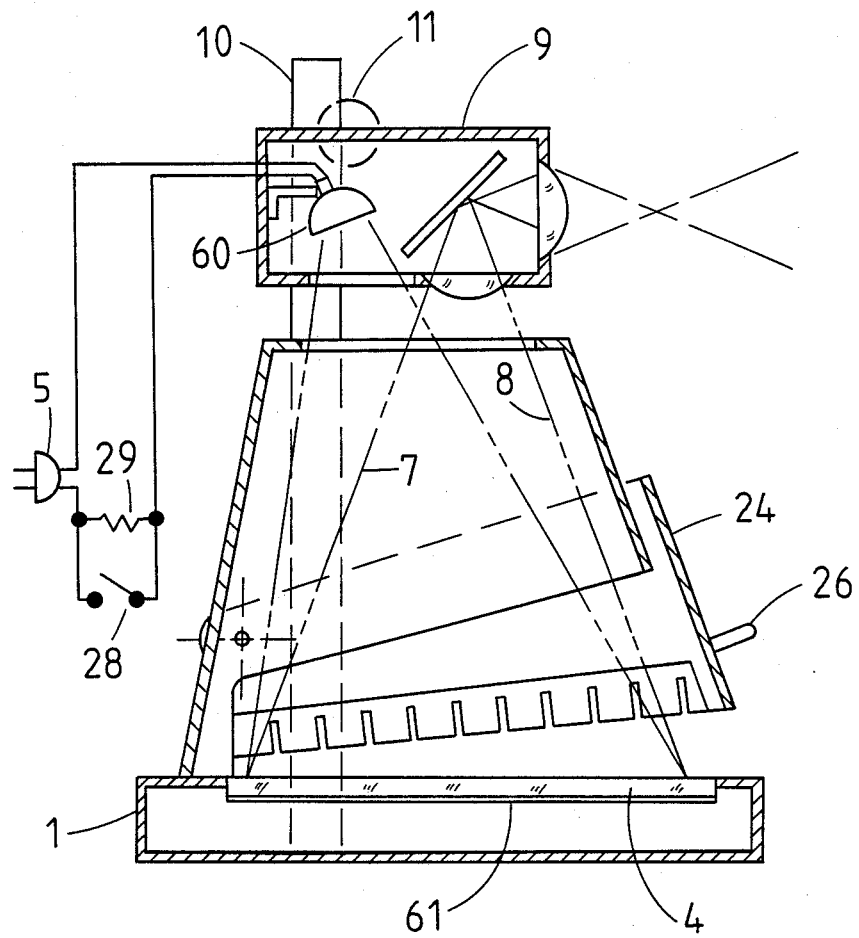
FIG. 6 is a side cross-sectional view of an embodiment of the invention in which a single light source is used for both modes of operation.

Referring to FIG. 6, the light source for transparency projection 60 can be placed in, or very near, projection lens assembly 9 if a slight loss in resolution due to parallax and optical losses due to unwanted reflections are acceptable. Source 60 then is located above surface 4 and a mirror 61 is placed immediately below the surface to reflect the light back up through from the bottom. The arrangement is sometimes used when portability is essential. As is seen by comparing FIGS. 6 and 2, housing 1 becomes quite compact and the overall size and weight is reduced.

Figure 1:
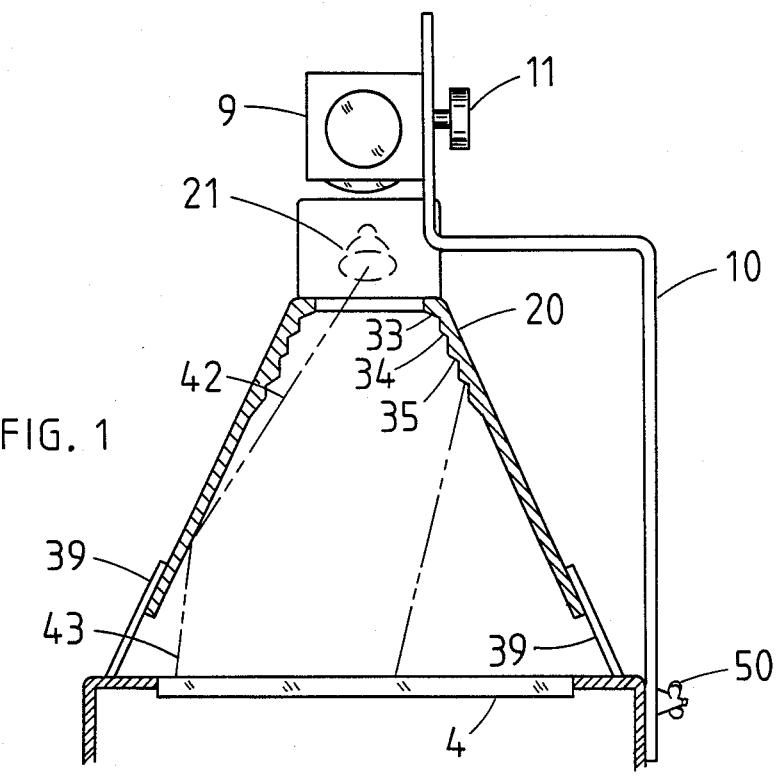
FIG. 1 is a front cross-sectional view of the hood region of an embodiment of this invention showing specific hood features.
Figure 5:
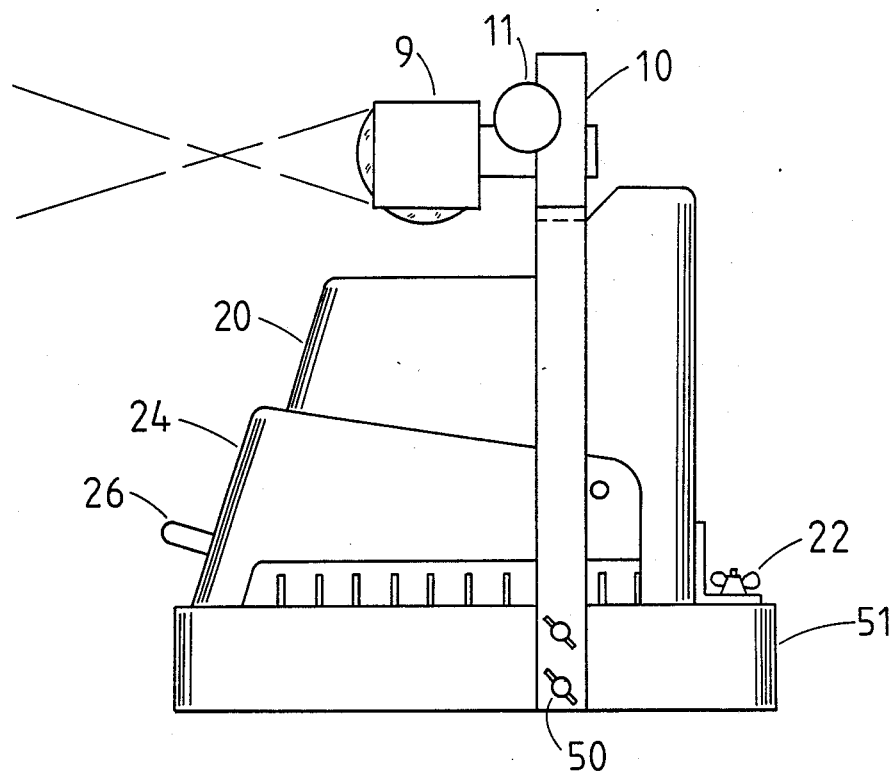
FIG. 5 is a view of the invention converted to solely an opaque mode.

The stage surface 4 of FIGS. 2 and 6 is typically constructed of a plastic fresnel lens sandwiched between two plates of glass. The fresnel lens tends to direct light rays passing through the surface and designated by double-dash rays 7, 8 toward projector lens assembly 9. The assembly 9 is vertically adjustable on staff 10 by focusing knob 11. That method of obtaining focus accounts for some of the success of overhead projectors because of its ease of manipulation. A clearer view of the focusing arrangement is shown in FIGS. 1 and 5. None of the aforementioned transparency structure is novel to this invention, per se, and is found in almost all overhead projectors.

Operation consists of placing the transparency to be projected upon the surface 4, activating the source 2 or 60, and focusing the image via knob 11. Optical losses include beam edge losses around the stage aperture (approximately a 2:1 loss), transmission losses through the stage surfaces and transparency (2:1 loss), and stray rays around the projection lenses due to fresnel inaccuracies (4:1). The reflexive optic of FIG. 6 add another 2:1 loss over those of FIG. 2. In any event, a total loss of at least 16:1 will be encountered. If the fresnel were not used the loss would be about twelve times greater, however, since peripheral rays 7, 8 would project out into space. The fresnel is thus a major contributor to projected-image intensity in the transparency case.

OPAQUE FEATURES

Referring to FIG. 2, in the present invention a hood 20 is mounted on base 1 via a fastener 22. Light source 21 when energized is oriented so as to flood the top surface of stage surface 4 with uniform, high intensity light. The source 21 is positioned outside of peripheral ray 7 so that no occultation of transparency light rays will occur. It is also positioned so that any specular reflection such as ray 31 from surface 4 or a glossy object lying on the surface will not be directly reflected into projection lens 9. Source 21 normally generates heat that preferably should be kept away from stage 4. Convection heat rises, and the location of source 21 enables such heat to escape through vent 55. A small fan can, if desired, be placed at the vent to assist in removing the heat.

A large aperture 23 in hood 20 allows projection lens assembly 9 an unobstructed view of stage surface 4. Hatch 24 which is part of the hood assembly can be opened by an operator via handle 26 in the direction indicated by arrow 25. When the hood is open a wide gap across the entire width of base 1 providing easy access to stage surface 4 appears as shown. Hatch 24 is preferably constructed of internally-glossy, transparent, substantially-reflecting material so that light from the interior is mainly reflected back into surface 4 area and an operator can see the surface without discomfort when the hood is closed.

Hatch 24 is shown in a half-open position in FIG. 2 for clarity, but in operation it will normally reside in either fully open or fully closed positions established by detent mechanisms 27, 28 respectively. The detents can take any of many well-known forms including magnetic latches, a spring-loaded cam rider at the hatch pivot, a thumb-actuated spring-loaded dead bolt, or the simple spring-loaded detent shown. No novelty is claimed for the detailed mechanism, but the invention requires that the hood have stable open and closed positions. The open position is normally used in the transparency mode, and the hood must be closed in the opaque mode. The process of FIG. 6 is identical.

Returning to FIG. 2, a switch 28 is activated by motion of the hatch. In one embodiment the switch, when the hood is open, imposes an impedance 29 in series with light source 21 causing the light intensity to decrease substantially. Impedance 29 can take a number o forms including rectifier, inductance, lamp, or other elements well-known to those skilled in the art. The light intensity is so great in the opaque mode that an operator would find the glare very uncomfortable if the hood were open during full light intensity.

In the embodiment of FIG. 6, source 60 is dimmed by hatch switch 28, shown schematically, in an identical manner.

TRANSPARENCY AND OPAQUE MODE INTERACTIONS

Switches 6 and 40 of FIG. 2 can be independent in which case light sources 2 and 21 can be activated at will by the operator. If source 2 is kept energized at all times it does not deleteriously affect either mode of operation. In an alternate arrangement the switches can be ganged as shown by dashed line 41. When ganged, activation of one source automatically extinguishes the other. The advantages of such an arrangement are that peak power consumption is reduced and switching between modes is simplified.

Figure 4:
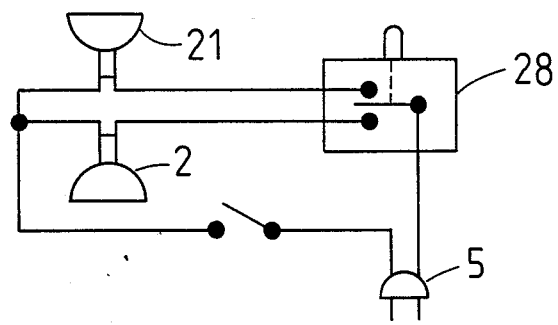
FIG. 4 is an alternative light source switching arrangement of the invention in which mode switching is activated by opening or closing a hatch.

Even further operational simplification can be attained by using the embodiment of FIG. 4. Hatch-actuated switch 28, of the single-pole-double-throw type, causes source 2 to activate when hatch 24 is opened, and source 21 to activate when the hatch is closed. Thus transparency operation occurs whenever the hood is opened and opaque operation when it is closed.

When an opaque object is to be projected, the operator places the object upon the stage surface 4 and closes tee hood. For purposes of exposition assume that the object is a document on ordinary bond paper. The exposition will be described relative to FIG. 2, but it will apply equally as well to the embodiment of FIG. 6 when source 60 is substituted for source 21. Light from source 21 show by triple-dashed rays 30, 31, 32 uniformly illuminate the document. Good bond paper typically has a reflectivity of 0.9, and therefore about 90% of the impinging light energy is reflected. The flat paper is a Lambertian reflector, i. e; it disperses light whose intensity is proportional to the cosine of a normal to the surface plane. In other words, the light scatters with some preference toward the vertical. In a typical case the extended source (the paper) will manage to reflect about a twenty-fifth of the incident energy into the projection lens 9. In the absence of novel features of this invention to be described below, the remaining energy would be mostly bounced about and absorbed by the inside surfaces of the hood as suggested by ray 65. When the paper reflectivity of 0.9 is combined with the scatter loss of 25:1 and a stage-edge spillage loss of 2:1 (similar to the transparency case), a total transmission loss of about 55:1 results. This compares to a 16:1 loss for transparency projection as described above. A 3.47:1 discrepancy must be overcome to obtain equivalent brightnesses for opaques and transparencies.

One way to obtain parity between modes in the arrangement of FIG. 2 is to increase the energy of light source 21. In most cases doubling is feasible, but power consumption eventually limits that approach since a fifteen-ampere line at 120 volts is often found in the field. Anything in excess of about a one-kilowatt source may kick circuit breakers. The present invention calls upon novel reflective technology to provide needed boost in the opaque mode without increasing power consumption.

Figure 3:
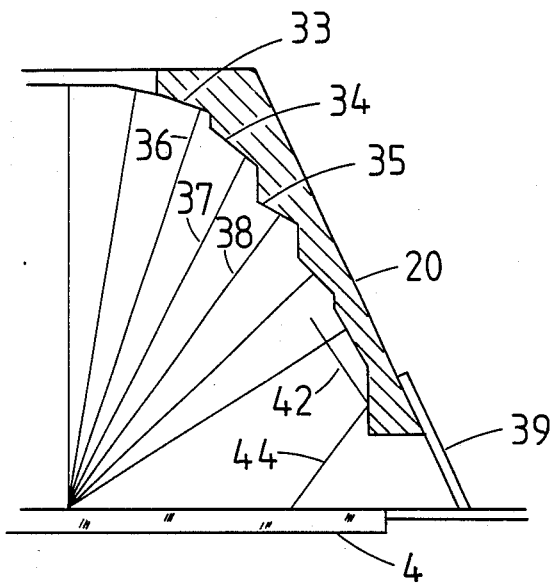
FIG. 3 is a cross-section of an expanded portion of a hood or hatch wall of the invention, showing retro-reflective and specular features.

Referring to FIG. 1, the lower inside surface of hood 20 is highly reflective and substantially vertical so that peripheral ray 42 that would normally fall outside of the stage aperture and be lost, is reflected back into the aperture as shown by ray 43. The cross-sections of the beams from light sources 2, 60, and 21 are essentially circular whereas the aperture is rectangular, and this accounts for most of the stage-aperture edge loss in both transparency and opaque cases. If the hood lower border reasonably conforms to the aperture shape, and the reflection produced by the hood is substantially specular in lower regions as shown in FIGS. 1 and 3, the 2:1 stage-aperture loss is reduced to about 1.2:1, a gain of about 1.67. Accordingly, the present invention provides specular reflection in a zone at the bottom of the hood assembly. The height of the zone need only be sufficient to encompass out-of-aperture beam edges from source 21 or 60. The specular property can be attained b a glossy or mirror surface.

Again referring to FIGS. 1 and 3, the inner surfaces of the upper portions of hood 20 can be provided with reflective facets 33, 34, 35 to obtain retro-directive reflection, in contrast to the non-retrodirective specular reflection in the bottom zone. Each facet is oriented so that its face is substantially normal to a ray 36, 37, 38 as shown in FIG. 3 scattered from stage surface 4. Thus whereas lower-zone reflector 44 of FIG. 3 operates upon light coming directly from the light source as indicated by ray 42, the upper-zone facets 33, 34, 35 operate upon rays scattered from the document on the stage surface. Since the latter stem from an extended source (the document), the accuracy of orientation of the facets is not highly critical as long as each facet reflects light dominantly back to surface 4.

In order to ascertain the degree to which such retro-directed light can increase brightness, some of the physics should be understood. Approximately 96% of the light energy stemming from source 21 of FIG. 2 will be scattered by the document and strike the hood 20. If all of the scattered light were reflected back to the document, of that amount again one twenty-fifth would be available to projection lens 9, and the remainder rescattered. The process would repeat and can be expressed as an infinite linear series. If the document were a perfect diffuser with 100% reflectivity and all scattered light were reflected back, eventually all light would make its way to projection lens 9. The intensity gain in that case would be 25, enough to exactly offset the scattering loss.

In practice all scattered light is not returned and the document does not have perfect reflectivity. If the reflectivity is designated by R and the fraction of light returned by F, a solution for intensity gain, G, provided by the infinite-series equation takes the form: $G = 1/(1-RF)$. As described above, the lower-zone improvement provided by reflector 44 of FIG. 3 yields a gain of approximately 1.67. An additional gain of 2.08 is necessary to enable opaque intensities to match those of transparencies. Since the paper reflectivity is 0.9, the portion of scattered light that must be returned by the retro-reflectors is found to be 57.7%, an obtainable value. The present invention provides retro-reflective properties in the upper zone of the hood assembly in keeping with the above teachings. Since the document is a Lambertian reflector, most of the scattered energy will appear in the upper zone, precisely where retro-reflection is provided.

A preferred method of obtaining retro-reflection is to coat the interior of the upper zone with a retro-reflective coating. Such commercially-available coatings are used for road signs and typically contain minute glass spheres that act as small retro-reflectors. In this case facets per se are not required since each glass sphere acts as a minute group of facets.

The detailed method of attaining retro-reflection in an upper zone and non-retroreflection in a lower zone can vary in numerous ways familiar to those skilled in the art. The invention resides in the employment of retro-reflection of light rays stemming from the illuminated opaque object, bu specular reflection of rays stemming directly from the light source.

To accommodate oversized objects placed upon surface 4, hatch 24 is provided with a resilient bottom border 39 as shown in FIGS. 1, 2, and 3 so that the bottom will substantially conform to the contour of such objects. As an alternative, the resiliency can be provided by suspending border 39 so that it yields in its entirety when encountering an oversized object. In that case some light leakage would be encountered but operation otherwise would be normal. When conformation to the object is desired border 39 can be made of rubber, flexible plastic, rubberized fabric, or other materials, and can be segmented as shown with independent compliance by segment. When its inner surface is glossy it can contribute to the desired lower-zone reflective properties. In the segmented case each segment can be rigid within its own bounds, e. g; hinged rigid plastic tabs would suffice. As seen in FIGS. 1 and 3 border 39 will normally be canted outward so that its compliance will tend to be in the same direction. This assists the compliance and additionally reduces any tendency for segments to fold inward.

In FIG. 3 the border 39 is shown affixed to hood 20, whereas in FIG. 2 the border is affixed to a hatch portion of the hood. Either arrangement will accommodate oversized objects and will satisfy the objective of the invention.

By simply removing attachment device 22 of FIG. 2 hood 20 and all elements attached thereto can be removed as a unit, leaving a conventional transparency overhead projector. If projection lens staff bracket 10 is also disconnected from base 1 via attachment 50 of FIG. 1, and the hood assembly and staff bracket 10 connected to a simple support base 51 as shown in FIG. 5, a stand-alone opaque projector results. Accordingly the invention provides considerable flexibility for various applications.

While the invention has been particularly shown and described with reference to preferred embodiments thereof, it will be understood by those skilled in the arts that various changes in form and details may be made therein without departing from the spirit and scope of the invention.

What is claimed as new and desired to be protected by Letters Patent is set forth in the appended claims.

I claim:

1. In an overhead transparency projector having a projection lens assembly positioned above a transparent-aperture stage, means for projecting an image of an opaque object positioned substantially upon said stage, comprising:

a first light source to illuminate said object and produce a reflecting ray;

light-intercepting means to intercept said ray only if said ray is not directed at said assembly, said light intercepting means including a hood that can be controllably opened;

a second light source to illuminate said stage aperture for transparency projection; and switching means to activate said first light source when said hood is closed and said second light source when said hood is open.

2. The projector as set forth in claim 1 in which said hood has a retro-directive zone to return said reflecting ray back to said object.

3. The projector as set forth in claim 2 in which said retro-reflective zone contains a mirror facet whose surface plane is substantially normal to a line extending from the center of said stage to the center of said facet.

4. The projector as set forth in claim 2 in which said retro-reflective zone contains a plurality of transparent spheres acting as retro-directive lenses.

* * * * *